United States Patent
Shlomai et al.

(10) Patent No.: US 8,078,649 B2
(45) Date of Patent: Dec. 13, 2011

(54) METHOD AND SYSTEM FOR CENTRALLY DEPLOYING AND MANAGING VIRTUAL SOFTWARE APPLICATIONS

(75) Inventors: Netzer Shlomai, Ra'anana (IL); Shay Ben-Hayun, Ra'anana (IL)

(73) Assignee: InstallFree, Inc., Stamford, CT (US)

( * ) Notice: Subject to any disclaimer, the term of this patent is extended or adjusted under 35 U.S.C. 154(b) by 339 days.

(21) Appl. No.: 12/419,072

(22) Filed: Apr. 6, 2009

(65) Prior Publication Data

US 2009/0254587 A1    Oct. 8, 2009

Related U.S. Application Data

(60) Provisional application No. 61/123,370, filed on Apr. 7, 2008.

(51) Int. Cl.
*G06F 7/00* (2006.01)
*G06F 17/30* (2006.01)

(52) U.S. Cl. ........ 707/803; 707/806; 707/809; 707/831; 709/219; 709/223; 709/227

(58) Field of Classification Search ........... 707/831, 707/803, 806, 809, 736, 796; 709/219, 223, 709/227
See application file for complete search history.

(56) References Cited

U.S. PATENT DOCUMENTS

| | | | |
|---|---|---|---|
| 2001/0034733 A1* | 10/2001 | Prompt et al. | 707/102 |
| 2005/0262173 A1* | 11/2005 | Choquier et al. | 707/204 |
| 2005/0267920 A1* | 12/2005 | Helliker et al. | 707/204 |
| 2006/0020586 A1* | 1/2006 | Prompt et al. | 707/3 |
| 2006/0155912 A1* | 7/2006 | Singh et al. | 711/6 |
| 2007/0078988 A1* | 4/2007 | Miloushev et al. | 709/227 |
| 2007/0239859 A1* | 10/2007 | Wilkinson et al. | 709/220 |

OTHER PUBLICATIONS

Kupezyk et al.—"Applications on demand" as the exploitation of the migrating desktop—Journal Future Generation Computer Systems, vol. 21, issue 1, Jan. 1, 2005 (pp. 37-44:1-8).*
Joita et al.—"Application deployment using catallactic grid middleware"—Proceeding MGC'05 of the $3^{rd}$ International workshop on Middleware for grid computing, Nov. 28-Dec. 2, 2005 Grenoble France (pp. 1-6).*

* cited by examiner

*Primary Examiner* — John E Breene
*Assistant Examiner* — Anh Ly
(74) *Attorney, Agent, or Firm* — Myers Wolin, LLC

(57) ABSTRACT

A system and method for centrally deploying and managing virtual applications in an organization. The method comprises retrieving an existing schema of objects from a management directory of the organization; generating a virtual directory including at least the retrieved schema of objects and a virtual application; and enabling performance of a plurality of management and deployment operations on the virtual directory.

11 Claims, 5 Drawing Sheets

METHOD AND SYSTEM FOR CENTRALLY DEPLOYING AND MANAGING VIRTUAL SOFTWARE APPLICATIONS

CROSS-REFERENCE TO RELATED APPLICATIONS

This application claims the benefit of U.S. provisional application No. 61/123,370 filed on Apr. 7, 2008, the contents of which are herein incorporated by reference.

FIELD OF THE INVENTION

The present invention relates generally to the execution of software applications, and more particularly to a method for deploying and executing virtual applications on desktop computers.

BACKGROUND OF THE INVENTION

Personal computers (PCs) serve a multitude of software applications, features and functions. The applications provide the user with tools to accomplish tasks, such as, but not limited to, document processing, spreadsheet management, email exchanges and Internet browsing. The features and functions are commonly referred to as "personalized information" and may comprise favorite Internet websites, contacts, Internet cookies, digital signatures, background images, desktop icons, application control bars, choice of default values and other configurable settings. In general, the personalized information differs from one user to another.

Typically, software applications are installed and setup using an automated installation process. The installation process is designed to enable the integration of the new functionality into the operating system, as well as ensuring that the application can be safely removed. Still, as an installation process is mostly carried-out by automatic installation programs, installation and setup of software applications remain a tedious task requiring as much as hours of work.

Generally, an automatic installation program performs the following activities: a) copying application software files from a removable storage (e.g., a compact disk) to the destination computer; b) configuring the operating system's parameters by, for example, the configuration of the system registry files; c) creating the application icons; and d) deleting temporary installation files.

Typically modern operating systems, such as Microsoft® XP® or Microsoft Vista® includes a registry file for storing operating system user and application settings and options, dynamic link libraries (DLLs) which contains shared code, and named objects for naming functions shared by different processes. This structure of an operating system causes most of the challenges associated with application installation, most notable of which are:

1. Operating system Stability and Performance: Installations permanently modify the operating system (even after uninstalling) resulting in an incremental decline in operating system performance due to uninstalled leftovers (orphan files), inflated registry files, and so on.

2. Conflicts: Installations cause application conflicts due to various incompatibilities and resource sharing issues.

3. Rigidness: Applications are installed into the operating system in a way that prevents the applications from being "detached" and migrated between different computers; applications are executed exclusively within the environment in which they were initially installed.

4. Security: When applications and the operating system are fused together, internal cross contamination is almost inevitable.

These problems have resulted in information technology (IT) departments expending substantial wasted time, money and manpower on application lifecycle tasks, regression/compatibility tests, deployment and management, help desk and support issues, and more. Moreover, users cannot switch between computers and work with common applications without installing and registering those applications on each computer. Thus, the user or a system administrator has to configure the personalized information when switching between computers.

Typically, IT managers create and maintain a directory service to include information about the network resources across a domain. The directory service is a hierarchical schema of objects representing resources (e.g., computers, printers, etc.), services (e.g., email), and users (e.g., user accounts, security groups, etc,). The directory service allows performing actions on such objects, e.g., organizing the objects, controlling access and sets security permissions. Generally, such directory service is in the form of an Active Directory by Microsoft®, lightweight directory access protocol (LDAP) like directory services, Kerberos based authentication, domain name server (DNS) based naming, and the like. These directory based technologies will be referred hereinafter as the "management directory."

It would be therefore advantageous to provide a solution for centrally deploying applications to any computers and/or user from a central server by utilizing already existing schema of objects maintained by the management directory. It would be further advantageous if the proposed solution would not modify the management directory's schema and would not require any installation of backend servers.

SUMMARY OF THE INVENTION

Certain embodiments of the invention include a method for centrally deploying and managing virtual applications in an organization. The method comprises retrieving an existing schema of objects from a management directory of the organization; generating a virtual directory including at least the retrieved schema of objects and a virtual application; and enabling the performance of a plurality of management and deployment operations on the virtual directory.

Certain embodiments of the invention also include a computer readable medium having stored thereon computer executable code. The computer executable code when executed by a processor or a computer causing the processor or computer to perform the process of centrally deploying and managing virtual applications in an organization. The process comprises retrieving an existing schema of objects from a management directory of the organization; generating a virtual directory including at least the retrieved schema of objects and a virtual application; and enabling the performance a plurality of management and deployment operations on the virtual directory.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
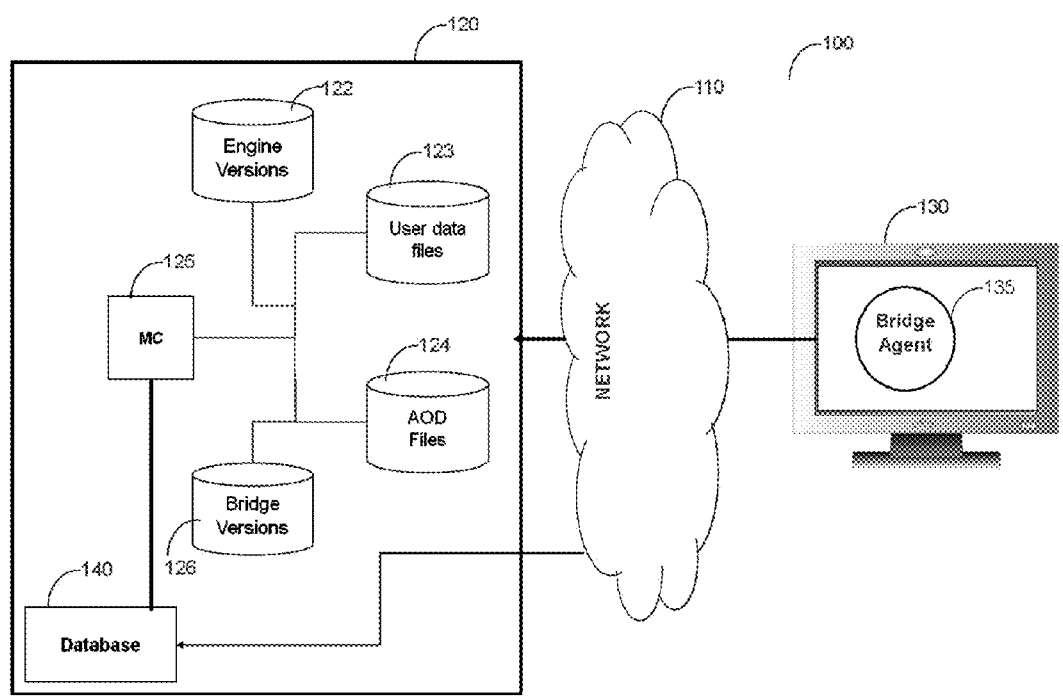
FIG. 1 is a diagram illustrating a computer network system useful in describing the principles of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a diagram illustrating a computer network system 100 useful in describing the principles of the invention. Without limiting the scope of the invention the system 100 is a simplified structure of a computer system deployed in an organization where only a single file server 120 connected through a network 110 to a single personal computer (PC) 130. It is appreciated that such systems typically includes one or more file servers and a plurality of PCs of users in the organization. The network 120 may be, but is not limited to, a local area network (LAN), a wide area network (WAN), the Internet, or any combination thereof.

The PC 130 may be any computing device running an operating system and include, for example, a laptop computer, a smart phone, a personal digital assistance (PDA), and the like. The operating system may be, but is not limited to, a Windows® XP®, Windows Vista®, Linux®, and the like. The PC 130 runs a bridge agent 135 which is a virtual service that enables central deployment of virtual software applications on the PC 130 without altering or making changes to the PC 130. Specifically, the bridge agent 130 retrieves, from the file server 120, files of virtual applications assigned to a user of the PC 130 and cause the execution of these applications over the PC 130. In addition, the bridge agent 135 performs shell integration by binding the virtual applications to the operating system shell. An operating system shell which provides access to the kernel services of the operating system. The PC 130 may be a locked-down computer which is a computer being operated by a user account or process that does not have full administrator permissions.

The virtual applications function as if they were installed on the PC 130 and are available online and/or offline. In accordance with an embodiment of the invention, a virtual application consists of the following files: a virtual engine, a user data file, and an application on demand (AOD) file. The virtual engine is an executable computing environment with its own read/write file system and registry, dynamic link library (DLL) repositories, and named objects. An AOD file includes all of the resources that an application needs to run, such as an internal virtual services manager, a digital rights management layer, a connectivity layer, and a protection layer. The protection layer seals the virtual applications from the environment of the host operating system of the PC 130 and provides the virtual applications with the required function calls and returned data and further preventing any data from being written to the host operating system. The connectivity layer enables the virtual application to communicate with other virtual applications and defines the integration with the operating system shell. For example, the connectivity layer includes registry keys and files that contain shell components, such as file extensions, program file links, system tray, quick launch, and so on.

The virtual applications executed over the PC 130 do not write data, files, registry keys, and so on to the host operating system, but instead write to the user data file that contains all the data written during the time the virtual application was active. The user data file may also include modified preferences, temporary files, registry changes, user files (e.g., documents, music, video, etc.), and so on. User data files may be encrypted. A detailed discussion on the structure of the virtual applications utilized by the invention and their execution can be found in U.S. patent application Ser. No. 11/697,700 filed Apr. 6, 2007 and U.S. application Ser. No. 11/697,702 filed Apr. 6, 2007, the contents of which are incorporated by reference herein in their entirety.

The virtual engines are stored, per virtual application, in a storage unit 122, the user data files are saved, per user and per application, in a storage unit 123, and the AOD files are maintained in a storage unit 124. In other implementations user data files, AOD files, and virtual engine files may be stored locally on the user PC. All storage units 122, 123 and 124 are part of the file server 120 which includes also a storage unit 126 for maintaining different versions of the bridge agents 135, each version may be per user or group of users.

In accordance with the principles of the invention the management console 125 enables organizations to centrally deploy and manage virtual software applications over a LAN, a WAN, and the like. The deployment and management of virtual applications in the organization is achieved by utilizing schema of objects maintained by the management directory 140 without changing or manipulating this schema. With this aim, the management console 125 accesses the management directory 140 to obtain the schema of the organization including, for example, objects representing resources, services, and users. The management directory may be Active Directory by Microsoft®, lightweight directory access protocol (LDAP) like directory services, Kerberos based authentication, domain name server (DNS) based naming, and the like.

The management console 125 generates a directory (hereinafter the "virtual directory") which is a structured tree displaying at least users and resources (e.g., computers) listed in the schema of objects maintained by the management directory 140. In addition, the virtual directory may display AOD files of virtual applications and system information.

Figure 2:
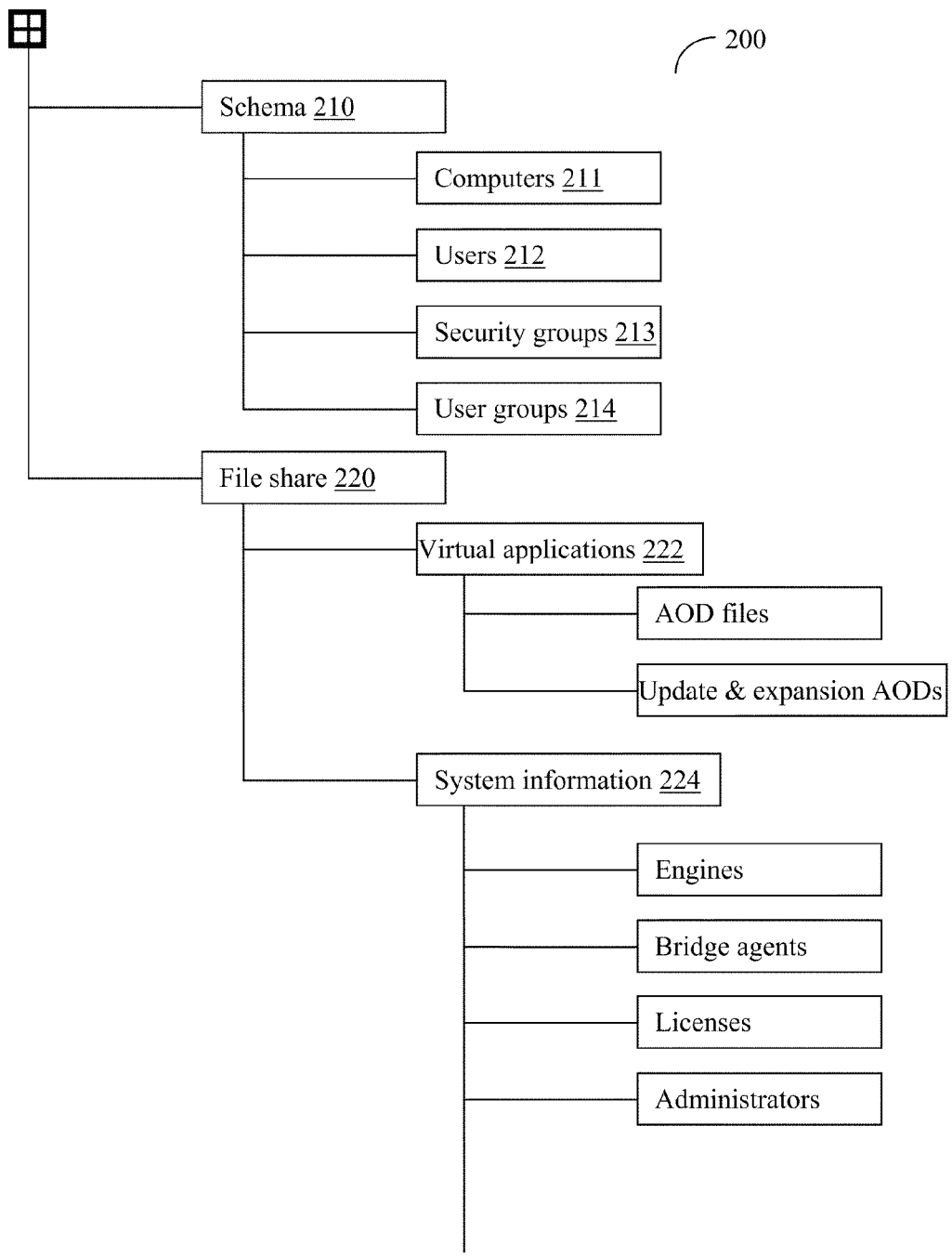
FIG. 2 is a diagram illustrating the structure of a virtual directory constructed in accordance with an embodiment of the invention.
Figure 3A:
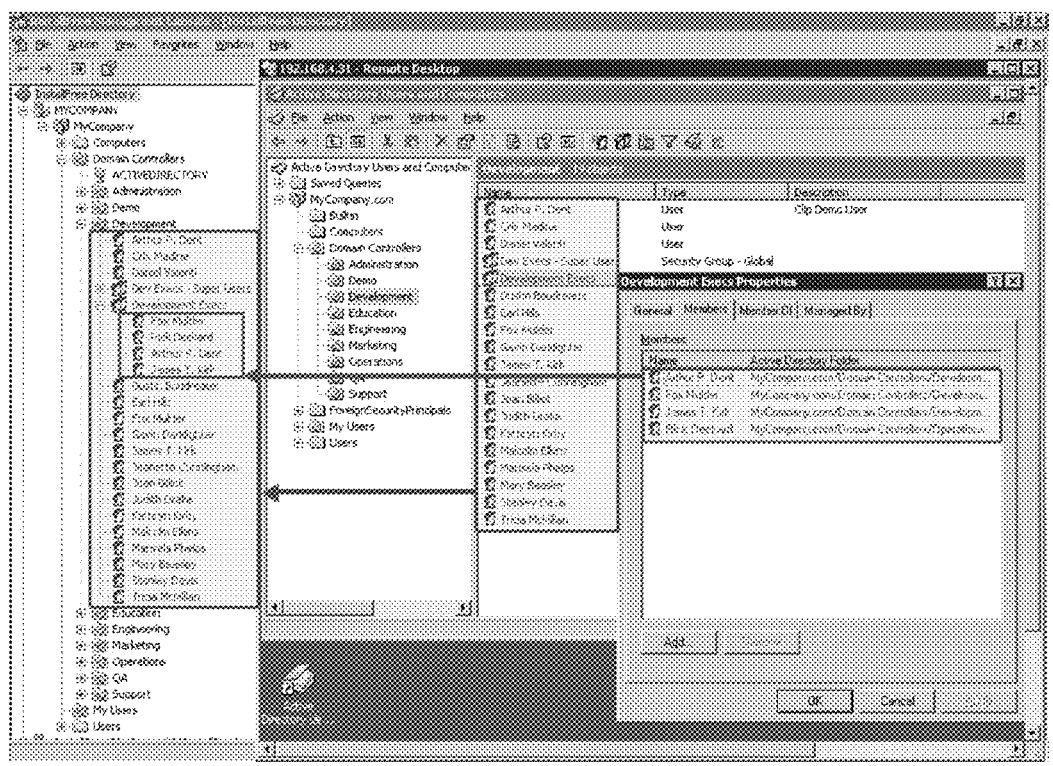
FIGS. 3A, 3B and 3C are examples for the contents displayed in the virtual directory.

FIG. 2 shows an exemplary and non-limiting diagram of the virtual directory 200 generated by the management console 125 in accordance with an embodiment of the invention. The higher level of the tree in the virtual directory 200 includes sub-directories of a schema 210 and a file share 220. The schema sub-directory 210 contains information obtained from the schema stored in the management directory 140. Specifically, the schema 210 lists the objects of domains 211, computers 212, users 213, user groups 214, security groups 215, and the others. The objects of the computers 212 and user groups 214 maintain the same structure as they appear in the management directory 140. For example, user groups 214 may be organized according to the different departments in the organization. The objects in the sub-directory schema do not inherit applications from their parents and their contents (i.e., list of users in a group) are displayed as a folder's content. An example for a sub-directory schema 210 "MyCompany" is shown in FIG. 3A.

Figure 3B:
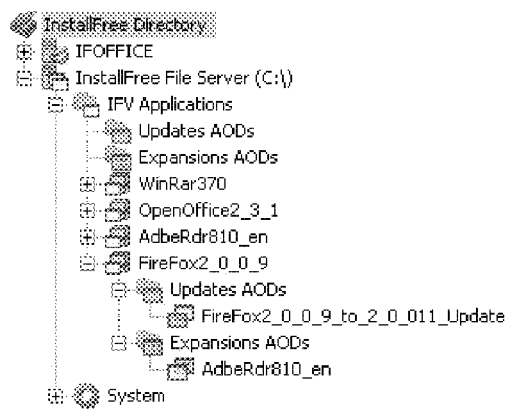

The file share sub-directory 220 includes a virtual applications tree 222 and a system information tree 224. The virtual applications tree 222 organizes and displays AOD files to be deployed to users and/or computers. The actual AOD files are stored in the storage unit 124. Each virtual application's AOD file that is uploaded to the file server 120 is displayed in the virtual applications tree 222. The tree 222 may contain at least one AOD file and may also include AOD files' updates and expansions, which are dynamically bound into their parent AOD files at runtime on the host PC 130. An example for the virtual applications tree 222 is shown in FIG. 3B. In this example, virtual application's AOD file is Firefox® version 2.0.0.9. The update AOD is a Firefox version 2.0.0.11 and the Adobe Reader AOD file is an expansion AOD (i.e., an add-on). When a user accesses this virtual application, it manifests as a Firefox 2.0.0.11 with an integrated Adobe Reader.

In one embodiment the AOD files can, in the tree 222, be organized into applications packages or containers. The applications containers or packages are used to group a selection of AOD files of virtual applications together and organize them for easy management and assignment. In a preferred embodiment of the invention multiple instances of the same AOD file can be displayed on the virtual applications tree 220. Each one of the instances may have different run time settings, dependencies and policies but yet, the file server 120 needs to hold only single AOD file.

Figure 3C:
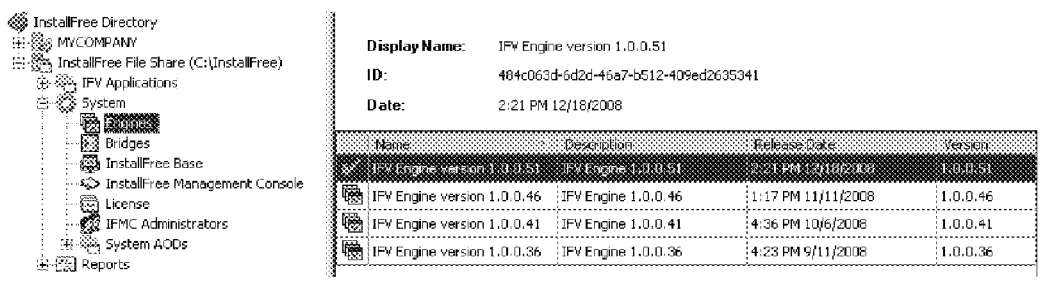

The system information tree 224 provides information about various files and data required for managing and deploying virtual applications. For example, the tree 224 maintains information about different versions of bridge agents (e.g., agent 135), different versions of engine files, applications' licenses, a list of system administrators that can access the management console 125, files required for the execution of the management console 125, and so on. An exemplary system information tree 224 and its content are shown in FIG. 3C.

The virtual directory 200 enables users (e.g., management console' administrator) to easily manage the deployment of virtual applications to PCs and users in the organization. Specifically, the schema 210 is generated based on already created schema objects of a data center in the organization, the administrator may perform various management and deployment operations on the schema 210 and further on the file share sub-directory 220. Following is a list of an exemplary and non-limiting set of management and deployment operations implemented in accordance with certain embodiments of the invention.

The transitive features of the schema tree 210 allow assigning virtual applications to any object in the schema 210, i.e., a specific user, a computer, a group of users, a security group, a domain, and so on. Once assigned the virtual application is distributed to the computers to be executed thereon. The applications are available to users when they logon to their computers. The child-objects in the schema sub-directory 210 automatically inherit access permissions to virtual applications from their respective parent-objects. This option can be excluded by the administrator.

The administrator can also configure operation modes of virtual applications through the virtual application tree 222 or schema sub-directory 210. The former option is performed when a default mode is set to an application whenever it is assigned to a user and the latter option valid when exceptions are required (e.g., different operation mode to different users). A virtual application's mode may be either online and offline. In the offline mode, when a user logs onto the server, the virtual application's file can be either downloaded completely from the file server 120, after which the user can work offline without being connected to the server 120. Alternatively, the virtual application's file can be downloaded by streaming as needed when the user stays connected to the server 120 in an online mode.

Through the virtual application's 222 tree the interconnectivity between different virtual applications, natively installed applications and the host's shell can be set. In addition, the virtual application tree 222 enables to manage (i.e., add, remove, modify, etc.) virtual applications' files, application packages, or application constrains by binding AOD files of the respective applications. Furthermore, AOD updates and expansions can be managed through the tree 222.

The transitive features of the system information tree 224 allows for managing at least virtual application virtual engine files and bridge agents. This includes, but is not limited to, assigning a specific version of an engine file and/or bridge agent to a virtual application and/or a specific object in the schema sub-directory 210, defining agent's properties, viewing a list of agents and engine files, and adding or removing versions of bridge agents or engine files. Other system maintenance operations may also be performed through the system information tree 224. Such operations include, but are not limited to, updating the list of licenses, list of administrators, updating files required for the execution of the management console 125, and so on.

It should be appreciated that generating the virtual directory 200 and the fact that the schema sub-directory 210 is based on information obtained from the management directory 140 eliminates the need for a system administrator to create a new schema for deployment of the virtual applications. Once the virtual directory 200 is ready a system administrator can simply assign virtual applications to objects in the schema 210 and manage virtual applications and their deployment. In addition, a system administrator can work on a schema that the system administrator is already familiar with. In that way the time required for deploying and managing virtual applications is reduced. Consequently, this solution allows lowering the total cost of ownership (TCO) of information technology deployment. It should also be appreciated that utilizing the virtual directory to manage and deploy virtual applications does not require any installation of backend servers or any other computing means to perform these tasks.

Figure 4:
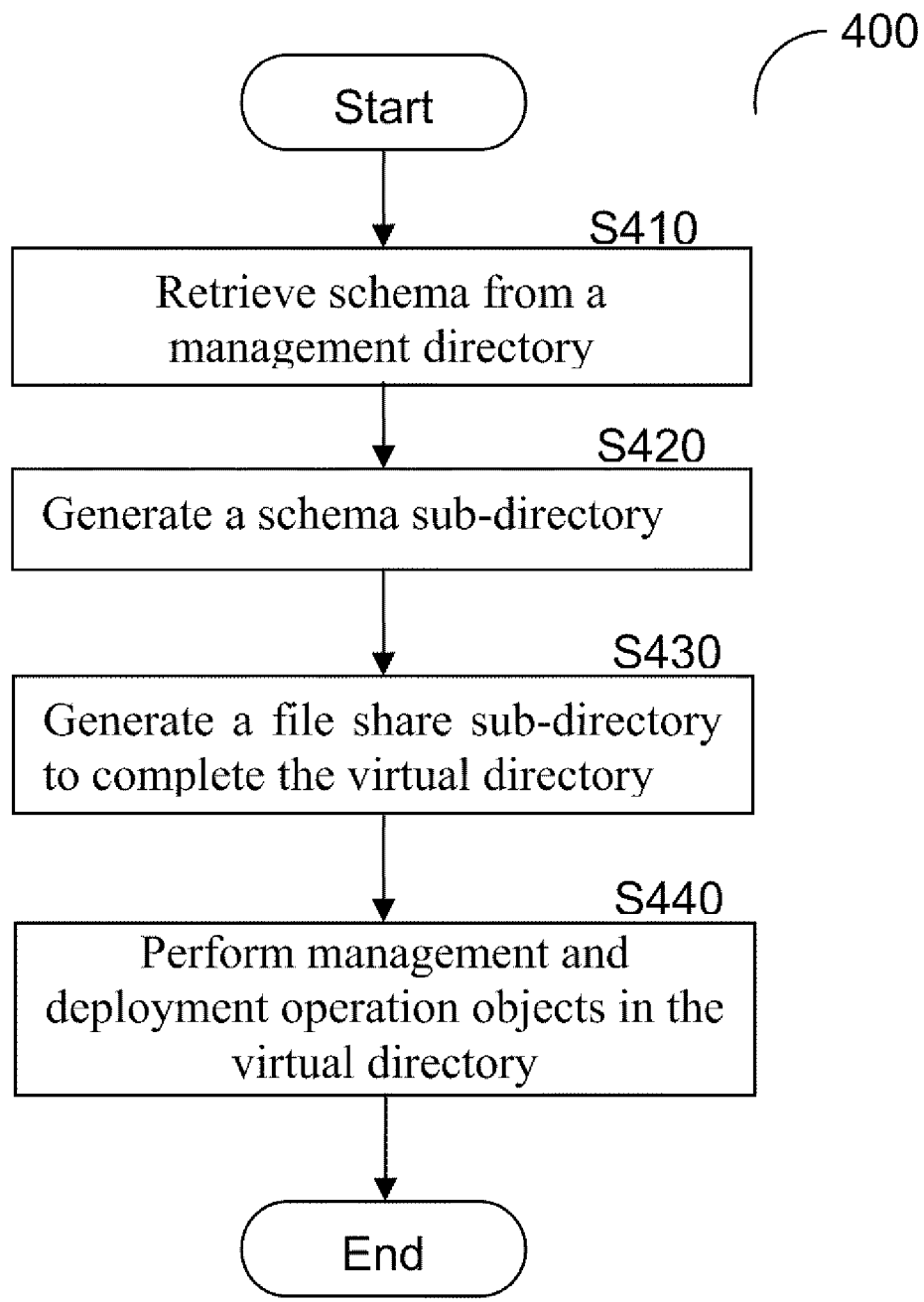
FIG. 4 is a flowchart describing the method for generating the virtual directory in accordance with an embodiment of the invention.

FIG. 4 shows an exemplary and non-limiting flowchart 400 describing the process for centrally deploying and managing virtual applications in accordance with an embodiment of the invention. At S410 the schema of objects is retrieved from the management directory 220. As mentioned above this schema contains the structure and entities (e.g., users, computers, groups and their relationships) in an organization's domain or network. At S420, based on the retrieved schema a schema sub-directory (e.g., schema 210) is generated to list the respective information stored in the management directory 240. At S430, the file share sub-directory 220 (e.g., sub-directory 220) is rendered to display the virtual application and system related information. This information is displayed in a virtual applications tree (e.g. tree 222) and system information tree (e.g., tree 224). The file share sub-directory can be generated based on the information stored in the storage units 122, 124 and 126 that respectively stored virtual engines, bridge agents, and AOD files. Alternatively or collectively, the contents of these trees can be filled-up as administrators add AOD files of virtual applications and/or new versions of bridge agents and virtual engines. Once S430 is completed the virtual directory is ready for the administrators to deploy and manage virtual applications. At S440 various management and deployment operations can be performed on the virtual directory. These operations include, but are not limited to, building virtual applications repository, assigning applications objects in the schema virtual directory, configuring virtual applications' mode of operation, managing file extension associations, configuring virtual application interconnectivity, managing virtual engines, managing bridge agents, updating applications' licenses, updating management console's files and administrators and so on. These operations as discussed in greater detail above.

The principles of the invention may be implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A method for centrally deploying and managing virtual applications in an organization, said method is performed by a file server that controls the deployment and management of the virtual applications in a plurality of client computers in the organization, comprising:
   retrieving an existing schema of objects from a management directory of the organization;
   generating a virtual directory including at least the retrieved schema of objects and a virtual application;
   enabling performance of a plurality of management and deployment operations on the virtual directory, wherein the plurality of management and deployment operations include at least assigning application on demand (AOD) files of virtual applications to any object in the schema of objects maintained by the virtual directory; and distributing the AOD files to objects the AOD files were assigned to.

2. The method of claim 1, wherein the virtual directory further comprising a system information tree.

3. The method of claim 2, wherein the system information tree organizes and displays various files and data required for managing and deploying virtual applications.

4. The method of claim 1, wherein the management directory is at least one of: Active Directory services, lightweight directory access protocol (LDAP) like directory services, Kerberos based authentication services, and domain name server (DNS) based naming services.

5. The method of claim 1, wherein the schema of objects specify at least any one of computers, users, user groups, and security groups defined in the domain or network of the organization.

6. The method of claim 1, wherein the virtual applications tree includes at least application on demand (AOD) files of virtual applications.

7. The method of claim 6, wherein the virtual applications further includes at least one of: updates of AOD files, expansions of AOD files, and one or more instances of an AOD file.

8. The method of claim 1, further comprising:
   configuring settings of a virtual application according to requirements of an object that the AOD files of the respective applications have been assigned to or according to administrator policy.

9. The method of claim 8, further comprising:
   managing file extension associations; configuring virtual application interconnectivity; managing virtual engines; managing bridge agents, and updating software licenses of virtual applications.

10. A non-transitory computer readable medium having stored thereon computer executable code when executed causing a processor to perform the process of centrally deploying and managing virtual applications in an organization, comprising:
    retrieving an existing schema of objects from a management directory of the organization;
    generating a virtual directory including at least on the retrieved schema of objects and a virtual application;
    enabling performance of a plurality of management and deployment operations on the virtual directory, wherein the plurality of management and deployment operations include at least assigning application on demand (AOD) files of virtual applications to any object in the schema of objects maintained by the virtual directory; and distributing the AOD files to objects the AOD files were assigned to.

11. The non-transitory computer readable medium of claim 10, wherein the process for centrally deploying and managing virtual applications in an organization is executed in a virtual environment.

* * * * *

UNITED STATES PATENT AND TRADEMARK OFFICE
CERTIFICATE OF CORRECTION

| | | |
|---|---|---|
| PATENT NO. | : 8,078,649 B2 | Page 1 of 1 |
| APPLICATION NO. | : 12/419072 | |
| DATED | : December 13, 2011 | |
| INVENTOR(S) | : Netzer Shlomai et al. | |

It is certified that error appears in the above-identified patent and that said Letters Patent is hereby corrected as shown below:

In the claims

<u>Column 8</u>
Claim 10, line 42, delete the word "on".

Signed and Sealed this
Second Day of August, 2016

Michelle K. Lee
*Director of the United States Patent and Trademark Office*